United States Patent Office 3,464,472
Patented Sept. 2, 1969

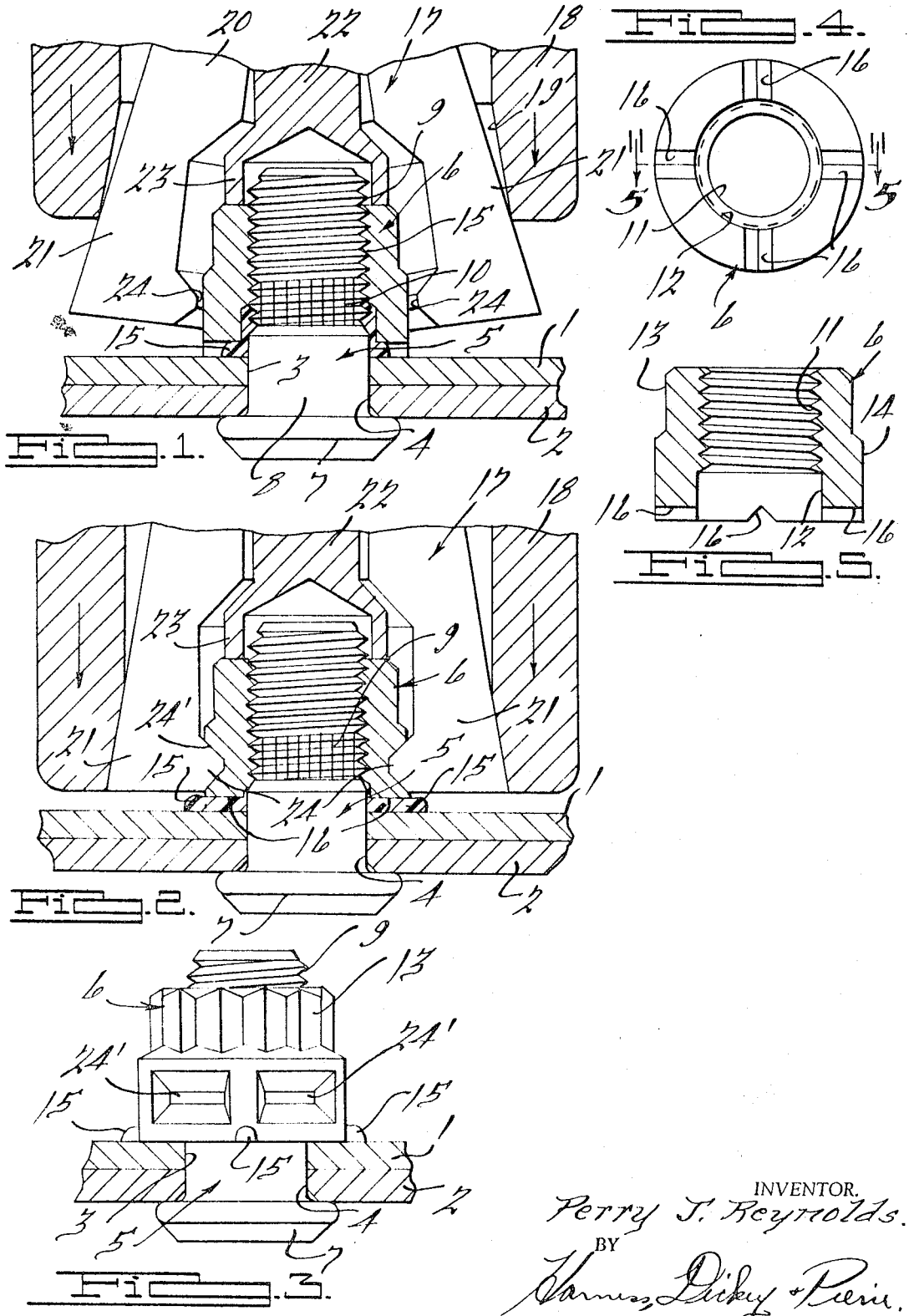

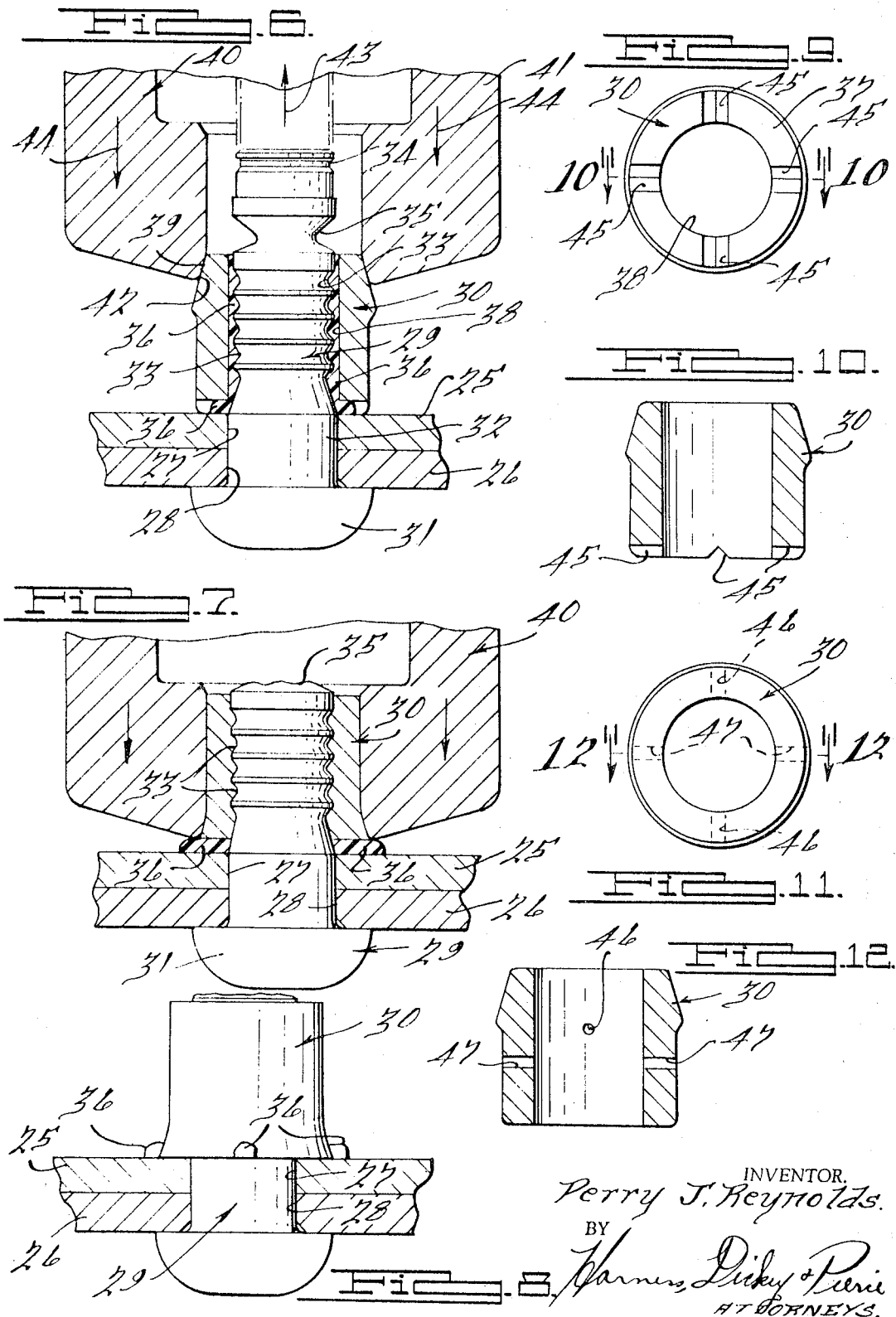

---

3,464,472
SWAGE TYPE FASTENERS HAVING SEALANT RELIEF PASSAGES IN COLLARS
Perry J. Reynolds, Detroit, Mich., assignor to Huck Manufacturing Company, Detroit, Mich., a corporation of Michigan
Filed Apr. 21, 1967, Ser. No. 632,726
Int. Cl. F16b 39/00, 19/00, 37/00
U.S. Cl. 151—2     3 Claims

---

ABSTRACT OF THE DISCLOSURE

A two-piece fastener including a pin and a collar with the collar adapted to be at least partially swaged onto the pin and with the collar having a plurality of relief grooves on its end face whereby sealant material located between the pin and the collar can be exhausted.

---

This invention relates generally to fasteners of the type in which a collar is deformed into interlocking engagement with a peripherally grooved locking portion of a pin and more particularly to an improved fastener of this type in which the collar has relief grooves that prevent trapping of any flowable material in the locking grooves when the fastener is finally set.

Fasteners of this general type are known in which the relief groove for preventing any trapping of the fluid is provided in the preformed locking grooves in the pin.

The two-part fastener of this invention may be either of the threaded and crimped type or the pull type lockbolt. Both include a pin having a preformed head adapted to be inserted through aligned openings from one side of the work and a collar adapted to be disposed over the pin at the opposite side of the work. The work usually consists of two or more plate or panel members having substantially aligned openings through which the pin extends. The pin head engages the outside surface of one of the plate members and the collar engages the outside surface of the other plate member and is positioned in substantial embracing relationship with that portion of the pin which is formed with the peripheral lock grooves. In some applications in industry a layer of a sealant, which is of the consistency of paste or a very thick fluid is disposed between the plates; and during insertion of the pin through the openings in the plate members, this sealant is wiped onto and partially or completely fills the locking grooves in the pin.

The sealant in the locking grooves can become trapped during installation and prevent an effective flowing of the collar metal into the locking grooves. This prevents the desired strong interlock between the collar and pin. It is an object of this invention, therefore, to provide fasteners of two-part pin and collar swage types which have the collar formed with relief grooves extending from the inside to the outside so that the sealant material may escape through the relief grooves during installation. This prevents a hydrostatic lock in the driven fastener and assures a fastening of proper and consistent high strength.

Other objects of the invention will become apparent from the following description and drawings and from the claims hereinafter set forth.

In the drawings in which like numerals are used to designate like parts in the several views throughout;

FIGURE 1 is a cross-sectional view, with parts in elevation, of one form of the invention showing the fastener applied to the work and the setting tool in open position and prior to swaging;

FIGURE 2 is a view similar to FIGURE 1 showing the fastener finally set and with the collar fully swaged;

FIGURE 3 is an elevational view, with the driving tool removed, and with the panel members shown in cross-section of the fully installed fastener;

FIGURE 4 is an end elevational view of the collar;

FIGURE 5 is a cross-sectional view of the collar taken substantially along the line 5—5 of FIGURE 4;

FIGURE 6 is a cross-sectional view with parts in elevation showing a pull type fastener in position on the work and with the driving tool in position prior to swaging;

FIGURE 7 is a view similar to FIGURE 6 and showing the driving tool in its final position with the fastener completely installed;

FIGURE 8 is an elevational view of the installed fastener showing the plate members in cross-section;

FIGURE 9 is an end elevational view of the collar shown in FIGURES 6, 7 and 8;

FIGURE 10 is a cross-sectional view taken substantially along the line 10—10 of FIGURE 9;

FIGURE 11 is a view similar to FIGURE 9 and showing a modified form of the collar of the present invention; and FIGURE 12 is a cross-sectional view taken substantially along the line 12—12 of FIGURE 11.

Referring to the drawings and referring particularly to FIGURES 1 through 7 thereof, one form of the present invention is illustrated. This form is generally of the type of fastener disclosed in the now co-pending application of Orloff et al., Ser. No. 537,117, filed Mar. 24, 1966.

A pair of panel or plate members 1 and 2 having aligned, circular openings 3 and 4 therethrough are adapted to be secured together by the present fastener. In certain applications, a sealant is disposed between the panel members 1 and 2.

The fastener in this embodiment comprises a pin generally indicated at 5 and a collar or nut generally indicated at 6. The pin has an integral head 7 at one end, a smooth cylindrical shank portion 8 and terminates in an externally screw-threaded end portion 9. The threads adjacent the smooth portion 8 are preferably serrated as indicated at 10 to provide an anti-rotation feature which will be more apparent from the completed description.

The collar 6 has a longitudinal center opening therethrough having screw threads 11 extending over a portion of the length thereof from one end and terminating in a smooth cylinder counter bore at 12 in the opposite end. The outer periphery of the collar 10 adjacent the threaded end is formed with alternate points and grooves indicated at 13 for cooperation with a socket wrench so that the collar 6 may be threaded onto the pin 5. The remaining outer wall portion 14 of the collar 6 is smooth so that a substantially uniform wall thickness extends to the end of the collar overlying the counter bore 12.

The fastener is assembled by inserting the pin 5 through the aligned openings 3 and 4 and as it is inserted through such openings the exterior threaded portion becomes coated with a layer of the sealant which is usually of the consistency of paste or a very thick fluid. Such sealant is diagrammatically illustrated in FIGURE 1 on the pin at 15. When the fastener is finally driven by a swaging or crimping operation, a hydrostatic pressure lock would develop, which results in a weakened fastener unless provision is made for relieving such pressure as disclosed herein. In order to maintain the high-strength requirements, the present invention contemplates relieving this pressure by the provision of relief grooves in the collar 6.

In FIGURES 1 through 5, such relief grooves are in the form of radially extending V-shaped grooves 16 extending from the inside of the collar to the outside thereof, which are formed in the end face of the collar 6 and and which end face is adapted to bear against the outer surface of the adjacent panel member 1.

The collar 6 is first threaded onto the end of the pin 5 so that the end face bears against the outside surface of panel 1. The fastener is finally set by a swaging or crimping operation, described in the above identified Orloff application, and by a crimping tool which is generally indicated at 17. The tool 17 per se forms no part of the present invention and is schematically illustrated. It comprises an outer solid annular member 18 having a tapered, annular inner surface 19. A collet 20 is formed with a plurality of logitudinally extending and separated spring fingers 21 which have outer tapered surfaces adapted to bear against the tapered surface 19. Such driving tool also has a stop 22 which terminates in an annular member 23 adapted to abut against the end of collar 6 in order to properly locate the position of the crimping portions of the fingers 21 with respect to the counter bore in the collar 6. Each finger 21 has an inwardly deposited, arcuate and V-shaped portion 24 which is thus adapted to be located and overlie the counter bore 12 of the collar uniformly therearound when positioned as shown in FIGURE 1.

Upon actuation of the driving tool 17, the member 18 is caused to linearally move relative to the fingers 21 in the direction of the arrows causing the spring fingers 21 to move inwardly to the position shown in FIGURE 2. This causes the wall portion 14 of the collar to change form as indicated in FIGURES 2 and 3 forming uniform depressions 24' therearound and swages those portions of the collar into interlocking engagement with the peripheral locking grooves formed by the adjacent threads 9 of the pin. The longitudinal serrations 10 formed through the peaks of the threads, about which the metal is swaged, will serve as anti-rotation locks.

During this swaging, the sealant 15 will be forced out through the passages 16 and relieve any hydrostatic pressure that might otherwise have been created during the final setting of the fastener.

In the embodiment illustrated, four of such grooves 16 are shown equally spaced around the end face of collar 6. This number may be varied within the scope of the present invention but it is preferred that such grooves be equally spaced for best results.

The formation of the relief grooves 16 in the end of the collar as here illustrated has the particular manufacturing advantage of permitting their formation during the heading of the collar so that no additional manufacturing step is required as in the case of the relief groove provided in the locking grooves of the prior art pins.

Referring to FIGURES 6 through 11, the present invention is illustrated with a pull type lockbolt of the type disclosed in Huck Patent No. 2,531,048 granted Nov. 21, 1950.

Panel members 25 and 26 are similar to members 1 and 2 in the embodiment described above and are provided with aligned openings 27 and 28. Again, in this form sealant, which is provided between the panels 25 and 26, must be relieved to be assured of a strong fastening.

The fastener comprises a pull type lockbolt pin generally indicated at 29 having a collar generally indicated at 30 applied thereto. The pin 29 has an integral head 31, a smooth cylindrical shank portion 32, and annular locking grooves 33 formed in the periphery thereof. A pin tail 34 having the usual annular pull grooves is formed as an integral extension of the locking groove portion of the pin 29 and an annular breakneck 35 is formed between the pull portion of the locking portion.

The pin 31 is inserted through the aligned openings 27 and 28 and during such insertion fluid sealant indicated 36 coats the pin and collects within the locking grooves 33.

The collar 30 is disposed over the projecting end of the pin 29 so that the inner face 37 of the collar bears against the outer adjacent face of the panel 25. The collar 30 is formed with a smooth longitudinal bore 38 which overlies the locking grooves. The outer surface of the collar is formed with an annular hold-off taper 39 in the collar illustrated.

A known driving tool generally indicated at 40 is used to set the lockbolt and such driving tool comprises an anvil 41 having an annular taper 42 which bears against the tapered shoulder 39 of the collar 30 when the tool is in position for driving. The tool has other mechanisms (not shown) which engages the pull grooves 34 and exert a pulling force in the direction of the arrow 43. A reaction force causes the anvil 41 to move in the direction of the arrows 44 from the position shown in FIGURE 6 to the final portion shown in FIGURE 7. When the anvil reaches this position, a built-up reaction force causes the pin to break at the breakneck 35.

During this swaging operation, the collar 30 is progressively swaged into the locking grooves 33 to the final swage position shown in FIGURE 7 and to force the material of the collar into the locking grooves 33 to affect an interlock between the pin and collar.

As stated above, in order to be assured of a strong fastening, the fluid 36 must be relieved. In this embodiment the relief is provided by radially extending grooves 45 formed in the end face 37 of the collar 30 similar to the relief grooves in the embodiment previously described. Thus, as the swaging takes place from the position shown in FIGURE 6 to that shown in FIGURE 7, the sealant 36 is forced outwardly. The grooves 45 extend from the inward cavity of the collar to the outside of the collar so that the sealant 36 is forced outwardly through the grooves 45 and any hydrostatic pressure that may have tended to form would be relieved.

In FIGURES 11 and 12, a modified form of the invention is illustrated in which instead of having the grooves 45 formed in the face of the collar, the relief grooves are in the form of diametrically opposed openings 46 and 47 extending through the collar wall. A pair of openings 46 and a pair of openings 47 are preferably longitudinally spaced with respect to each other so as to provide for progressive relief as the collar is swaged and are disposed at uniform spacing around the collar. The openings may be formed by a simple drilling operation and while they are illustrated here as being in two pairs, additional openings at other areas may be provided, if desired.

Formal changes and variations may be made in the various embodiments of the invention described without departing from the spirit and scope of the invention.

What is claimed is:

1. A fastening device for securing together a plurality of faying surfaces of members having aligned openings and compressible sealant between the members comprising, in combination, a pin extending through the openings having peripheral locking grooves in the extending portion to which the sealant material is applied during application and an annular collar positioned about said locking grooves and having an end face engageable with the surface of the adjacent member and adapted to be swaged onto said pin so that portions of said collar project into said grooves to provide for an interlocking engagement of said collar and said pin; said end face being generally planar and having a plurality of relief grooves opening thereonto, said relief grooves being generally symmetrically arranged about the periphery of said collar and extending radially from the inside of said collar to the outside thereof for exhausting a portion of the sealant material disposed in said locking grooves during swaging, said relief grooves being narrow and extending for only a small portion of the circumference of said end face.

2. The fastening device of claim 1 with said pin having a shank with a head at one end and being threaded at its opposite end, said collar being internally threaded generally from its front face for a substantial portion of its length for threaded engagement with said pin and having an end portion proximate said end face normally spaced from said shank prior to final setting of the fastener and being at least partially swaged into said shank after final setting of the fastener with said end portion being in communication with said relief grooves whereby sealant material located in said end portion can be expelled out through said relief grooves during swaging of said collar onto said pin.

3. The fastening device of claim 1 in which said collar is adapted to be swaged substantially over its entire length.

References Cited

UNITED STATES PATENTS

| | | |
|---|---|---|
| 2,978,263 | 4/1961 | Walsh et al. |
| 918,367 | 4/1909 | Rancillaz _____ 151—2 |
| 2,006,461 | 7/1935 | Kramer _____ 151—2 |
| 3,137,197 | 6/1964 | Meyer. |
| 3,139,786 | 7/1964 | Ardell _____ 85—7 |
| 3,290,982 | 12/1966 | Marschner _____ 85—7 |

FOREIGN PATENTS 913,759   12/1962   Great Britain.

RAMON S. BRITTS, Primary Examiner

U.S. Cl. X.R.

85—7, 32